US007472338B2

(12) United States Patent  
Carro

(10) Patent No.: US 7,472,338 B2  
(45) Date of Patent: Dec. 30, 2008

(54) METHOD AND APPARATUS FOR LOCATING ITEMS ON A PHYSICAL DOCUMENT AND METHOD FOR CREATING A GEOGRAPHICAL LINK FROM AN ELECTRONIC DOCUMENT TO THE PHYSICAL DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 09/892,399

(22) Filed: Jun. 26, 2001

(65) Prior Publication Data

US 2002/0047870 A1 Apr. 25, 2002

(30) Foreign Application Priority Data

Aug. 29, 2000 (EP) .................................. 00480080

(51) Int. Cl.
*G06F 15/00* (2006.01)
(52) U.S. Cl. ...................... 715/205; 715/207; 715/208
(58) Field of Classification Search ............. 715/500.1, 715/501.1, 517, 526, 530, 205, 207, 208
See application file for complete search history.

(56) References Cited

U.S. PATENT DOCUMENTS

| 3,760,360 A | 9/1973 | Reynolds et al. |
| 4,274,081 A | 6/1981 | Nomura et al. |
| 4,289,333 A | 9/1981 | Gaetano |
| 4,348,660 A | 9/1982 | Robertsen et al. |

(Continued)

FOREIGN PATENT DOCUMENTS

EP 0 652 505 A1 5/1995

(Continued)

OTHER PUBLICATIONS

Robinson et al., "A framework for interacting with paper", Eurographics '97, vol. 16, No. 3—[www.cl.cam.ac.uk/Research/Origami/Origami1997c/index.html], pp. 1-9.*

(Continued)

*Primary Examiner*—Rachna Singh
(74) *Attorney, Agent, or Firm*—Schmeiser, Olsen & Watts; David R. Irvin; John R. Pivnichny

(57) ABSTRACT

A method and apparatus for locating items on a physical document and a method for creating a geographical link from an electronic document to the physical document. The geographical link is created by encoding, in a geographic link to the physical document, geographic coordinates of a referenced item in the electronic document. The electronic document is not derived from the physical document. Locating items on the physical document includes calibrating an opto-touch foil that is aligned on the physical document, including processing a calibration location included in locations appearing in the physical document and referred to in the electronic document. For each location, foil coordinates of the opto-touch foil corresponding to where each location appears in the physical document are computed utilizing geographic coordinates of each location and a generated calibration relationship between the geographic coordinates of the calibration location and calibration foil coordinates of the opto-touch foil.

26 Claims, 10 Drawing Sheets

U.S. PATENT DOCUMENTS

| | | | |
|---|---|---|---|
| 4,504,913 A | 3/1985 | Miura et al. | |
| 4,523,188 A | 6/1985 | Huber | |
| 4,532,395 A | 7/1985 | Zukowski | |
| 4,550,310 A | 10/1985 | Yamaguchi et al. | |
| 4,571,684 A | 2/1986 | Takanabe et al. | |
| 4,661,811 A | 4/1987 | Gray et al. | |
| 4,680,430 A | 7/1987 | Yoshikawa et al. | |
| 4,812,980 A | 3/1989 | Yamada et al. | |
| 4,849,911 A | 7/1989 | Campian | |
| 4,853,498 A | 8/1989 | Meadows et al. | |
| 4,855,725 A | 8/1989 | Fernandez | |
| 4,868,912 A | 9/1989 | Doering | |
| 4,952,918 A | 8/1990 | Fujita et al. | |
| 4,973,960 A | 11/1990 | Mount, II | |
| 5,010,323 A | 4/1991 | Hoffman | |
| 5,070,467 A | 12/1991 | Todome | |
| 5,105,544 A | 4/1992 | Ontiveros et al. | |
| 5,149,919 A | 9/1992 | Greanias et al. | |
| 5,150,457 A | 9/1992 | Behm et al. | |
| 5,202,828 A | 4/1993 | Vertelney et al. | |
| 5,239,152 A | 8/1993 | Caldwell et al. | |
| 5,243,149 A | 9/1993 | Comerford et al. | |
| 5,250,929 A | 10/1993 | Hoffman et al. | |
| 5,311,302 A | 5/1994 | Berry et al. | |
| 5,315,129 A | 5/1994 | Forrest et al. | |
| 5,353,016 A | 10/1994 | Kurita et al. | |
| 5,422,812 A | 6/1995 | Knoll et al. | |
| 5,495,581 A | 2/1996 | Tsai | |
| 5,555,354 A | 9/1996 | Strasnick et al. | |
| 5,597,183 A | 1/1997 | Johnson | |
| 5,624,265 A | 4/1997 | Redford et al. | |
| 5,640,193 A | 6/1997 | Wellner | |
| 5,668,576 A | 9/1997 | Ikura et al. | |
| 5,692,073 A | 11/1997 | Cass | |
| 5,703,436 A | 12/1997 | Forrest et al. | |
| 5,706,030 A | 1/1998 | Ishigami et al. | |
| 5,757,026 A | 5/1998 | Forrest et al. | |
| 5,757,139 A | 5/1998 | Forrest et al. | |
| 5,811,833 A | 9/1998 | Thompson | |
| 5,834,893 A | 11/1998 | Bulovic et al. | |
| 5,844,363 A | 12/1998 | Gu et al. | |
| 5,861,219 A | 1/1999 | Thompson et al. | |
| 5,861,885 A | 1/1999 | Strasnick et al. | |
| 5,870,767 A | 2/1999 | Kraft, IV | |
| 5,903,729 A | 5/1999 | Reber et al. | |
| 5,905,251 A | 5/1999 | Knowles | |
| 5,915,285 A | 6/1999 | Sommer | |
| 5,917,280 A | 6/1999 | Burrows et al. | |
| 5,918,012 A | 6/1999 | Astiz et al. | |
| 5,923,388 A | 7/1999 | Kurashima et al. | |
| 5,932,895 A | 8/1999 | Shen et al. | |
| 5,953,587 A | 9/1999 | Forrest et al. | |
| 5,957,697 A | 9/1999 | Iggulden et al. | |
| 5,984,362 A | 11/1999 | Christman | |
| 5,986,401 A * | 11/1999 | Thompson et al. | 313/504 |
| 5,998,803 A | 12/1999 | Forrest et al. | |
| 6,005,252 A | 12/1999 | Forrest et al. | |
| 6,013,538 A | 1/2000 | Burrows et al. | |
| 6,013,982 A | 1/2000 | Thompson et al. | |
| 6,138,072 A * | 10/2000 | Nagai | 701/207 |
| 6,148,260 A * | 11/2000 | Musk et al. | 701/200 |
| 6,326,946 B1 * | 12/2001 | Moran et al. | 345/156 |
| 6,674,426 B1 * | 1/2004 | McGee et al. | 345/173 |
| 6,752,317 B2 * | 6/2004 | Dymetman et al. | 235/462.45 |

FOREIGN PATENT DOCUMENTS

| | | |
|---|---|---|
| JP | PUPA 01-195318 | 8/1989 |
| JP | PUUMA 05-15075 | 2/1993 |
| JP | PUPA 05-145724 | 6/1993 |
| JP | PUPA 09-046776 | 2/1997 |
| JP | PUPA 09-305752 | 11/1997 |
| JP | PUPA 10-040055 | 2/1998 |
| JP | PUPA 2000-056896 | 2/2000 |
| JP | PUPA 2000-125024 | 4/2000 |
| JP | PUPA 2000-172402 | 6/2000 |

OTHER PUBLICATIONS

Arai et al., "PaperLink: a technique for hyperlinking from real paper to electronic content", Proceedings of the SIGCHI conference on Human Factors in computing systems, published by ACM Press, Mar. 1997, pp. 327-334.*

Newman et al., "A Desk Supporting Computer-based Interaction with Paper Documents", Proceedings of the SIGCHI conference on Human Factors in computing systems, published by ACM Press, May 1992, pp. 587-592.*

Grasso et al., "Augmenting Paper to Enhance Community Information Sharing", Proceedings of DARE 2000 on Designing augmented reality environments, published by ACM Press, Apr. 2000, pp. 51-62.*

Aral, T., et al.; "PaperLink: A Technique for Hyperlinking from Real Paper to Electronic Content"; CHI 97, Atlanta, GA USA; Mar. 22, 1997; pp. 327-334; XP000697132; ISBN: 0-89791-802-9.

* cited by examiner

Main components of the invention

The opto-touch foil

Light emitting foil technology

Components of the preferred embodiment of the invention

FIG. 6

Paper map and Web page referencing locations on the map

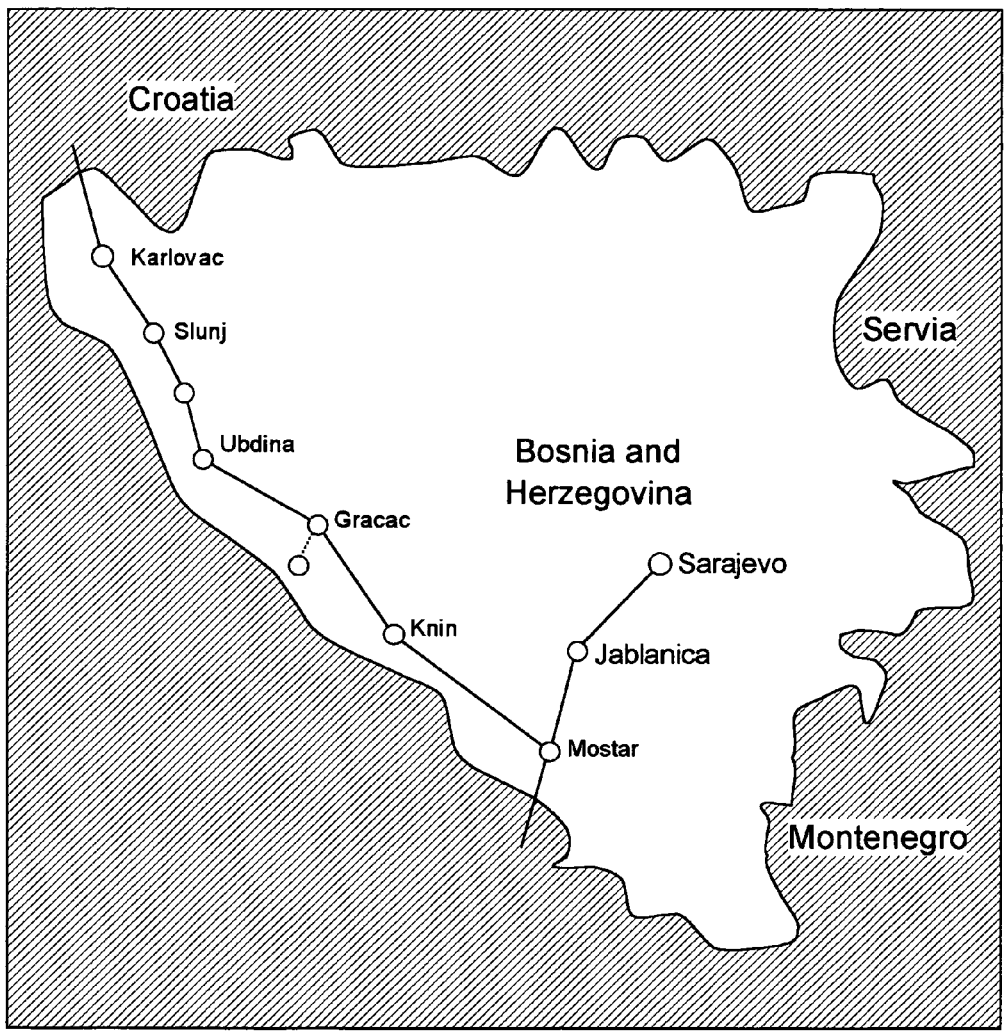

Bosnia and Herzegovina: C.I.A. 1994. (Call no. G6860 1994. U5 Case D) - 1/1,250,000

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

from: http://www.linder.com/berserk/dalmatia.html

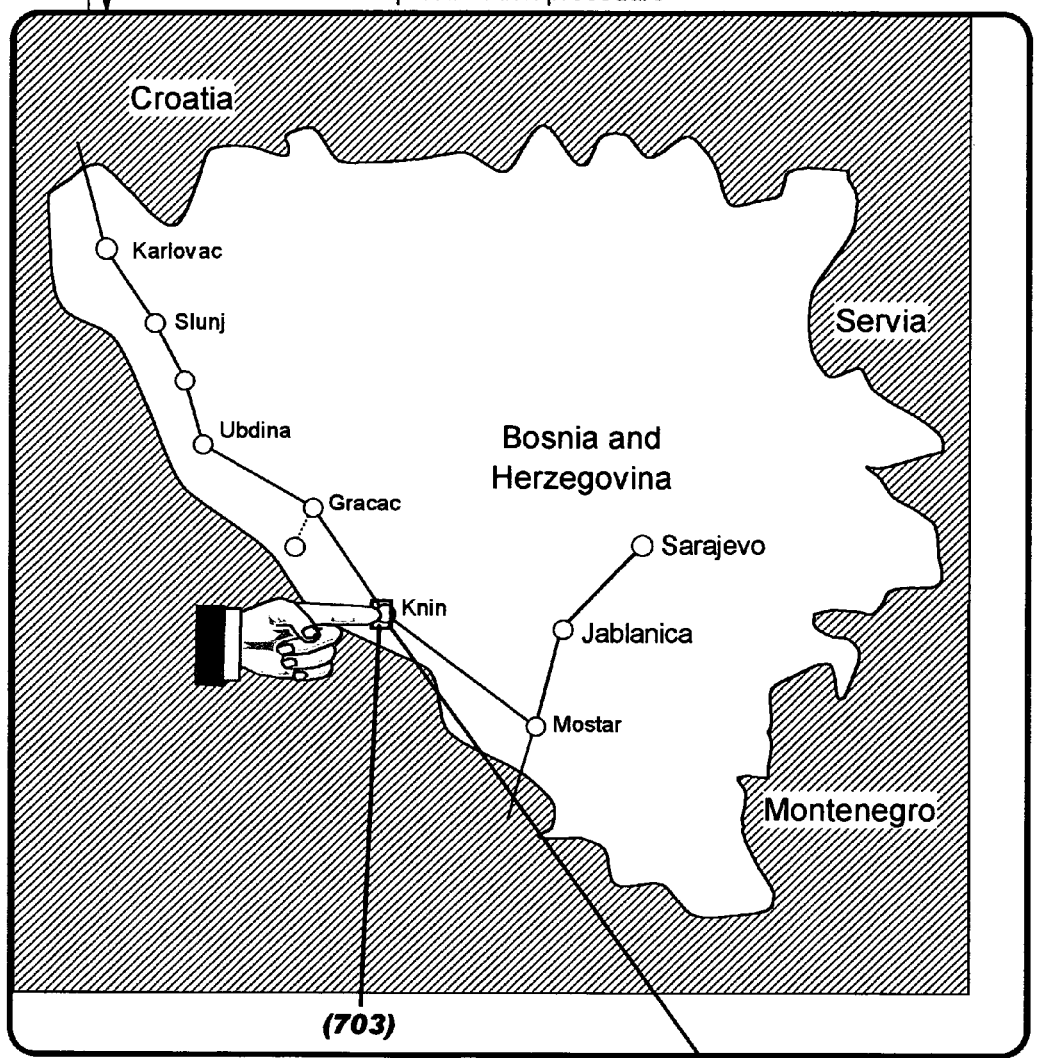

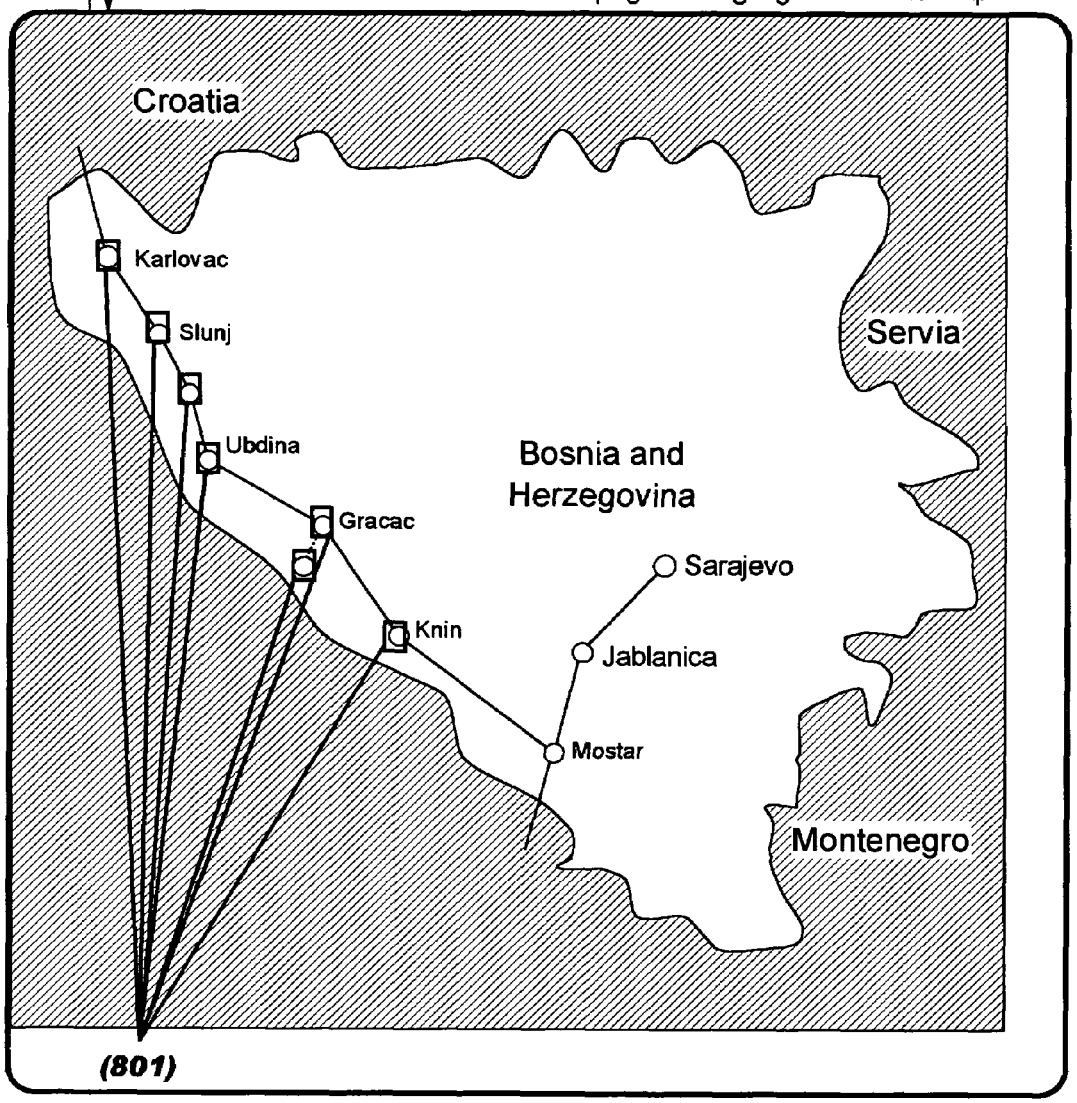

FIG. 8
Locations referenced on the Web page are highlighted on the map

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

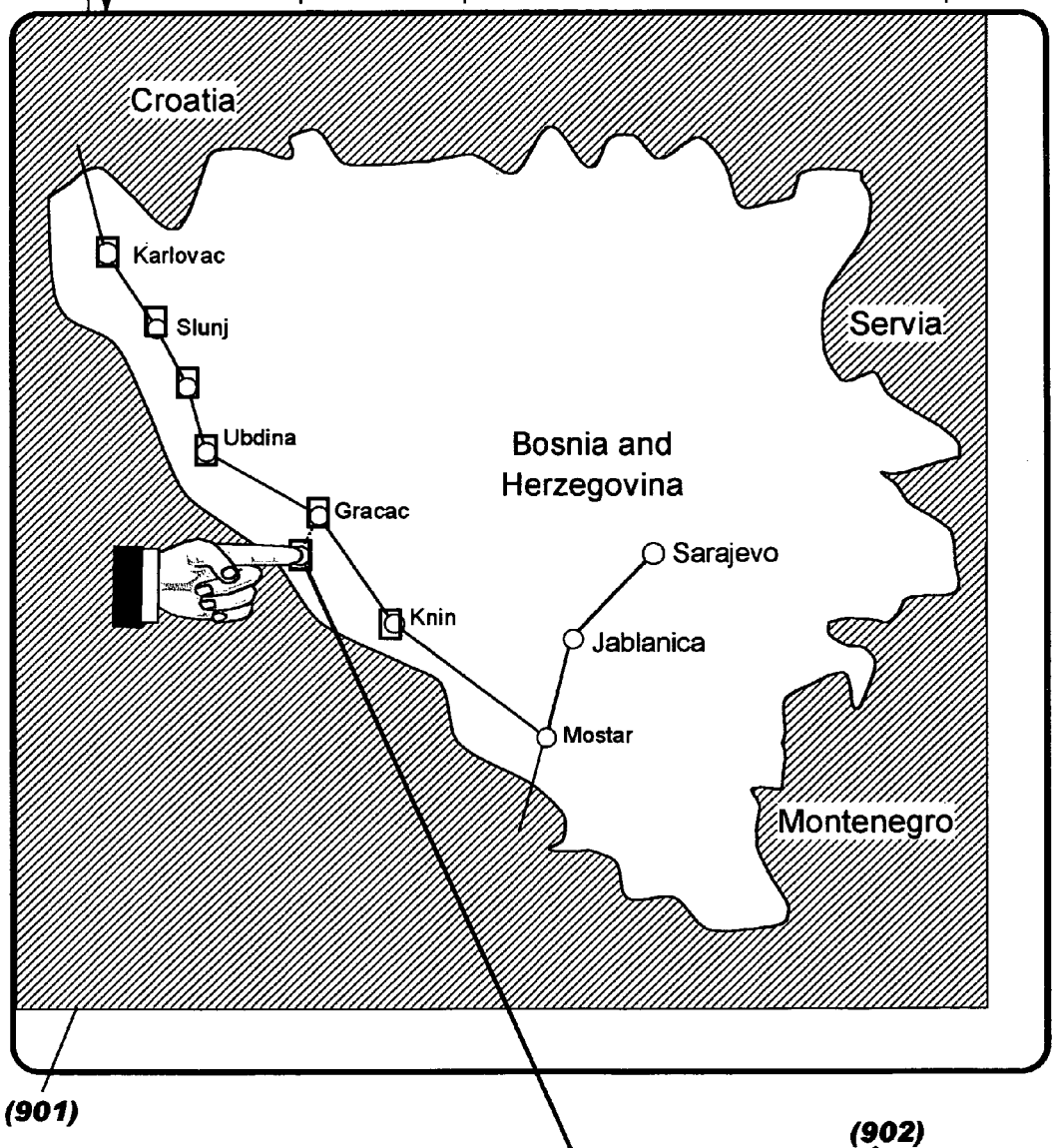

FIG. 10
The user triggers the hyperlink of a referenced location

(1001)

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

(1002)

53231 PLITVICKA JEZERA - NATIONAL PARK
 tel: +385 53 751-000  fax: +385 53 751-001
TOURIST INFORMATION AND RESEVATIONS
 tel: +385 53 751-015  tel: +385 53 751-014  fax: +385 53 751-013

HOTEL BELLEVUE/GARNI/(160 beds) **
telephone: +385 53 751 700, 751 015(reservation); telefax: +385 53 751 013

The National Park Plitvicka jezera (Plitvice Lakes) is one of the most beautiful

METHOD AND APPARATUS FOR LOCATING ITEMS ON A PHYSICAL DOCUMENT AND METHOD FOR CREATING A GEOGRAPHICAL LINK FROM AN ELECTRONIC DOCUMENT TO THE PHYSICAL DOCUMENT

FIELD OF THE INVENTION

The present invention relates to interactive multimedia systems and more particularly to a method and system for locating on a physical document items referenced in an electronic document. In a preferred embodiment, the present invention discloses a method and system for highlighting on a paper map the geographic position of places referenced in a Web page.

BACKGROUND

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

- transmitting and receiving electronic mail,
- logging into remote computers (the "Telnet"), and
- transferring files and programs from one computer to another ("FTP" or "File Transfer Protocol").

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

- an Internet-based navigation system,
- an information distribution and management system for the Internet, and
- a dynamic format for communicating on the Web.

The Web seamlessly integrates the format of information, including still images, text, audio and video. A user on the Web using a graphical user interface ("GUI", pronounced "gooey") may transparently communicate with different host computers on the system, different system applications (including FTP and Telnet), and different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g.: HTTP, FTP, and so forth), the name of the server, and the location of a file on that server.

Hyper Text Transfer Protocol

Each Web page may appear as a complex document that integrates, for example, text, images, sounds and animation. Each such page may also contain hyperlinks to other Web documents so that a user at a client computer using a mouse may click on icons and may activate hyperlink jumps to new pages (which are graphical representations of other document files) on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages.

When browsing, web clients convert user specified commands into HTTP GET requests, connect to the appropriate Web server to get information, and wait for a response. The response from the server can be the requested document or an error message.

After the document or an error message is returned, the connection between the Web client and the Web server is closed.

The first version of HTTP was a stateless protocol. That is, there was no continuous connection between each client and each server. The Web client using HTTP received a response in the form of HTML data or other data. This description applies to version 1.0 of HTTP protocol, while the new version 1.1 breaks this barrier of stateless protocol by keeping the connection between the server and client alive under certain conditions.

Browser

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

Hard-Copy Documents

During the last years, due mainly to the widespread use of personal computers and the universal access of millions of users to the World Wide Web, "multimedia publishing" has veritably exploded. On one hand, due to the widespread penetration of CD-ROM drives, an enormous number of multimedia titles combining text, images and sounds, are now accessible to owners of personal computers. On the other hand, a great deal of hypermedia information is today accessible via the Internet on the World Wide Web.

A study of the need for information shows a common thread. For a variety of reasons, people often require to be rapidly and easily informed about their environments. They want to have information about the resources or services located in the different regions of the world, in rural, industrial or urban areas. This common need was recognized long ago by Geographic Information Systems (GIS) providers, cartographic information providers and, more recently, by most of the Internet information providers (e.g., Netscape Local Channel on http://www.netscape.com/local/index.html). These institutions and many others (e.g.: travel agencies, government agencies, local authorities, etc.) today provide geographic and cartographic information in the Web by means of several services. Basically, these services enable the user to access, browse or download many different types of digitized maps covering practically all regions of the world. Recently, due mainly to the widespread use of the Global Positioning System (GPS) and in-vehicle computerized navigation systems, and to the universal access of millions of users to the World Wide Web, the field of "digital map publishing" has veritably exploded. Due to the widespread penetration of CD-ROM drives, many geographic and cartographic titles are now available to owners of personal computers. Because Internet users can access GIS applications from their browsers without purchasing proprietary GIS software, WebGIS has the potential to make Distributed Geographic Information (DGI) available to a large, worldwide audience. Today WebGIS makes possible to add GIS functionality to a wide range of network-based applications in business, government, and education. Due to this rapid evolution, a great deal of cartographic content is today accessible via the Internet, particularly the World Wide Web.

Even though electronic digital maps may be accessed and retrieved throughout the Web by any Internet device (e.g., by a Personal Digital Assistant (PDA) or WAP enabled smart phone), some drawbacks persist. The retrieval, storage and display of high resolution digital maps require high communication bandwidth, a large memory, and a high graphic resolution. The wireless mobile environment, wherein small, economic, lightweight hand-held devices are commonly used (such as cell phones and Personal Digital Assistants), imposes some constraints for transferring, storing, displaying and manipulating in a Web Browser large image files such as high resolution digital maps. Today, however practically all wireless devices are small and are, limited by communication speed, storage capacity, display area, and energy consumption.

To overcome these limitations, several technologies are emerging. These technologies are intended to provide Internet service providers, telecommunications carriers, and Internet-based businesses a way of offering Web content (originally intended to be displayed on PCs and laptops) to users of wireless devices. For example, IBM's WebSphere Transcoding Publisher:

http://www-4.ibm.com/software/webservers/transcoding/ translates existing information and images on Web sites into a format readable by hand-held devices, such as cell phones, games consoles, PDAs or Web browsers installed in cars. The aim of transcoding is, for example, to re-size a map. If a driver requests a street map from his car-based Web browser, the transcoding software can take a map originally designed for a PC-based browser and re-size it to fit the screen of the mobile device installed in the car. However, with the technology available today, a paper road map of normal size and resolution cannot be read comfortably after having been digitized, minimized, and displayed on the small screen of a cell phone or even on the screen of a hand-held PDA. Thus, even if transcoding is a good solution to adapt the format of highly textual Web pages, this technique does not solve the problem of displaying, even with a minimum of comfort, a digitized version of a full size paper map on the small, low-resolution display of a cell phone.

Even though the public's enthusiasm for new computer-based multimedia services has been seen by many analysts as a threat to the conventional forms of hard-copy publishing, particularly book publishing, experience teaches that reading a book cannot be compared with reading an electronic medium. In fact, people are very skilled at browsing through paper catalogs, magazines, newspapers, maps and books by flipping through the pages and glancing at pictures and text. Today, reading a paper copy is preferred by most people, whether they are familiar with computers or not. A Publication entitled "The Last Book", (*IBM Systems Journal*, Vol 36, No. 3 Vol 36, No. 3-1997, by J. Jacobson, B. Comiskey, C. Turner, J. Albert, and P. Tsao of the MIT Media Laboratory), clearly illustrates the differences between printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

The same arguments concerning the friendliness and usefulness of hard-copy books are applicable to hard-copy geographic maps. To locate one or several places, a collection of printed color maps can be much more easily and quickly browsed than a sequence of digital maps screens.

Paper maps have a number of useful advantages over portable electronic displays:

Paper maps are larger;
They can be viewed, marked, or manipulated easier and faster;
They are portable, familiar and easily distributed.

Thus, even though the enthusiasm of the public for computer-based digital mapping may be seen as a threat to conventional paper maps, reality is that for many people, in real and practical circumstances, the friendliness, usefulness and availability of paper maps cannot be reproduced today with electronic maps. The use of paper maps remains preferable for most people, whether they are skilled or not in using computers.

Nevertheless, touching directly the objects we have around us is one of the simplest, most instinctive, and universal human actions, and finger pointing and touching are the most natural forms of human/machine interface. The action of touching is so simple and natural that navigating by means of touch screens requires no training and no learning. In fact the pervasiveness, robustness, and versatility of the "touch technology" is transforming the way people are living, working, learning, and playing.

"Touch technology" is successfully used in many different applications.

In industrial environments, environmentally-robust touch screens are increasing productivity under hazardous and hostile conditions that would destroy a standard Personal Computer and keyboard.

In hospitals, touch input helps doctors to prescribe medications to patients faster by allowing handwritten prescriptions.

In retail locations, interactive, through-the-window displays let customers shop whenever they want, even when a store is closed.

In mobile and consumer devices, touch and stylus input is a widely accepted input method.

At tourist destinations, user-friendly kiosks are a cost-effective way to help travelers get information and make reservations.

Two main advantages of touching are its simplicity and versatility. Touching with the fingertip is the simplest and most intuitive form of pointing and selecting an item. Touching is particularly adapted to applications where the use of a keyboard, a mouse, or an optical pencil or stylus is not practical or is not well adapted to the user's service or comfort.

Traditionally, a touch panel is integrated into the computer display. The touch panel and the display form a combination called a "touch screen". The input device is integrated into the monitor, so no space is wasted, and the interaction of the user with the system is made easier. The system guides the user by showing different choices in the form of icons displayed on the screen. When the user touches the icon of choice, the associated action is executed.

In conclusion, there is a real need to provide a system and method for enriching the static information provided by conventional paper documents, maps and drawings.

There is a need to locate on physical documents, items referenced in electronic documents while accessing through the Web hyperlinked information (mostly textual) related to these items.

There is a need to provide mobile users with additional information directly accessible from hard-copy documents and more particularly to illuminate on paper maps, places referenced on Web pages.

There is a need to display information on physical documents while keeping intact the integrity of these physical documents.

None of the methods described in the prior art discloses a method or system that would enable a user to see illuminated, on paper maps, locations of resources or services referenced in an electronic document.

OBJECTS OF THE INVENTION

It is an object of the present invention to improve the current systems and methods of selecting, accessing and displaying electronic multimedia information or services.

It is a further object of the present invention to highlight, on a physical (hard-copy) document or physical surface, information related to items selected in an electronic (soft-copy) document while accessing multimedia information and/or services located in a user workstation or in one or a plurality of servers connected to a communication network.

It is a further object of the present invention to enable a user, when browsing a Web page comprising references to locations in the world (e.g., names of towns, oil posts, motels, buildings, hospitals, monuments, etc.), to receive visual indications showing the position of said locations illuminated over a physical map, even if said locations are not represented on said map.

SUMMARY OF THE INVENTION

The present invention provides a method of creating a geographic link from an electronic document to a physical document for locating, on the physical document, an item referenced in the electronic document, comprising the steps of:

defining the referenced item in the electronic document, said electronic document not being derived from the physical document;

determining geographic coordinates of the referenced item;

defining the geographic link to the physical document; and encoding the geographic coordinates in the geographic link.

The present invention provides a method of locating items appearing on a physical document, comprising the steps of: calibrating an opto-touch foil that is aligned on the physical document, said calibrating comprising processing a calibration location comprised by a plurality of locations appearing in the physical document and being referred to in an electronic document, said electronic document not being derived from the physical document, each location of the plurality of locations having geographical coordinates, said processing generating a calibration relationship between the geographic coordinates of the calibration location and calibration foil coordinates of the opto-touch foil, said calibration foil coordinates corresponding to where the calibration location appears in the physical document; and for each location of the plurality of locations, computing foil coordinates of the opto-touch foil corresponding to where each location appears in the physical document, said computing utilizing the geographic coordinates of each location and the calibration relationship.

The present invention provides an apparatus for locating items appearing on a physical document, comprising:

means for calibrating an opto-touch foil that is aligned on the physical document, said means for calibrating comprising means for processing a calibration location comprised by a plurality of locations appearing in the physical document and being referred to in an electronic document, said electronic document not being derived from the physical document, each location of the plurality of locations having geographical coordinates, said means for processing adapted to generate a calibration relationship between the geographic coordinates of the calibration location and calibration foil coordinates of the opto-touch foil, said calibration foil coordinates corresponding to where the calibration location appears in the physical document; and means for computing foil coordinates of the opto-touch foil, for each location of the plurality of locations, corresponding to where each location appears in the physical document, said means for computing utilizing the geographic coordinates of each location and the calibration relationship.

The present invention discloses a system and method of creating in an electronic document one or more of hyperlinks to a physical document for locating on the physical document, one or more items referenced in this electronic document from an user system connected to an opto-touch foil placed on or under the physical document. The method comprises the steps of:

defining referenced items in the electronic document; and for each item referenced in the electronic document,
determining absolute coordinates;
defining a hyperlink to the physical document; and
encoding the absolute coordinates in the hyperlink.

The present invention further discloses an electronic document comprising one or more referenced items, each referenced item comprising a hyperlink to a physical document, each hyperlink comprising encoded absolute coordinates of the corresponding referenced item, this hyperlink being used for locating the item on the physical document from a user system connected to an opto-touch foil placed on or under the physical document.

The present invention further discloses a system and method of locating on a physical document one or more items referenced in an electronic document comprising hyperlinks to this physical document. The method for use in a user system connected to an opto-touch foil placed on or under said physical document comprises the steps of:

identifying the items referenced in the electronic document; and
identifying the physical document, and for each referenced item that has been identified computing from the absolute coordinates, foil coordinates corresponding to the position of the item on the physical document.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 6 shows a paper map and a Web page referencing locations on the map.

FIG. 7 illustrates the method of calibrating the map.

FIG. 8 shows how locations referenced on a Web page are illuminated by means of the opto-touch foil placed over the map.

FIG. 9 shows how to identify a highlighted location.

FIG. 10 shows how the user can retrieve from the Web an information or service associated with a location

DETAILED DESCRIPTION

The invention provides a system and a method for locating on physical documents items referenced in electronic documents and for accessing multimedia information and/or services located in a user workstation or in one or a plurality of servers connected to a communication network. More particularly, the invention discloses a system and method for highlighting on a paper map the geographic location of one or more places cited or referenced in a Web page.

In a particular embodiment, the invention relates to the creation in electronic documents of hyperlinks to physical documents and more particularly to a system and method for assigning geographic coordinates to items (for example places like towns, oil posts, motels, public buildings, water springs, historic monuments, factories, etc.) cited or referenced in an electronic document (for example cited in a Web page). The activation of a "geographic link" associated with a particular item results in highlighting the position of this item on a physical document, for example a paper map.

In a particular embodiment, the system comprises a transparent opto-touch foil placed in alignment upon a physical map and connected to a user workstation. The opto-touch foil generates optical signals highlighting the locations, on the physical map, of all places referenced in the electronic document. The system comprises means for computing the coordinates on the opto-touch foil of the locations referenced in the electronic document and for highlighting these locations on the physical map by luminous signals.

The user places the opto-touch foil on the selected map. The opto-touch foil is calibrated according to the scale of this map and according to the position and alignment of the opto-touch foil placed on or under the map. In a particular embodiment, this operation is executed first by entering the scale of the map into the workstation and second by pressing the opto-touch foil on a particular location called a calibration location.

The system comprises means for sending from the opto-touch foil to the user workstation, the opto-touch foil coordinates corresponding to a point pressed by the user, and for associating these coordinates with geographic coordinates and with the address of another electronic document locally stored on the user workstation or accessible on a remote server connected to the network.

Once the map is calibrated, all locations that are referenced in the electronic document (geographically linked to the physical document) are automatically highlighted as spots of light by the opto-touch foil. Each time the user activates a "geographic link" to the map, a spot of light on the referenced location blinks on the map, helping the user to identify and locate the locations referenced in the electronic document (Web page).

Figure 1:
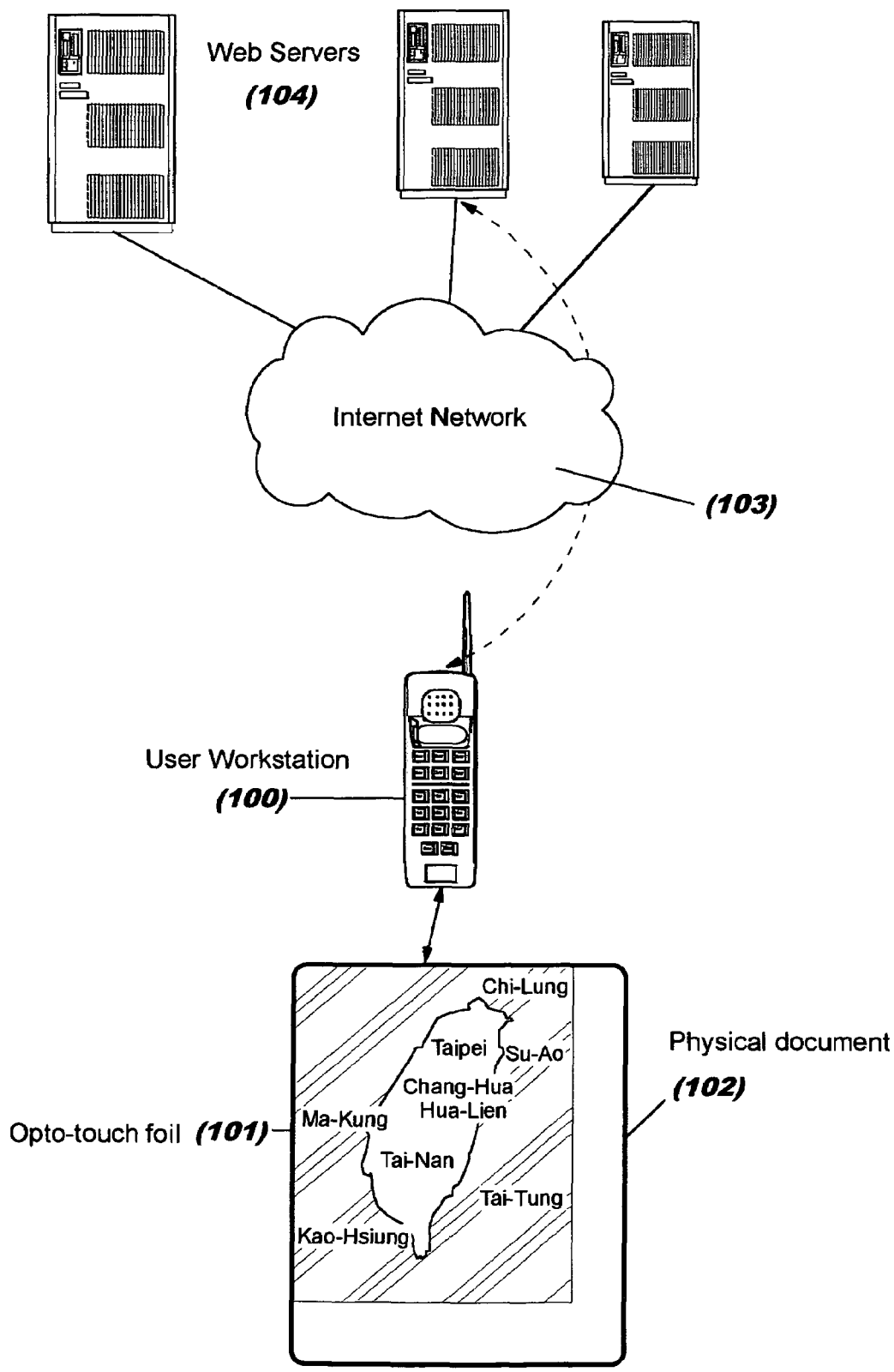
FIG. 1 shows the main components of the invention.

As shown in FIG. 1, the system according to the present invention comprises:

(100) A user workstation (preferably connected to a communication network) for accessing and displaying multimedia information and services.

(101) An opto-touch foil, preferably transparent, connected to the user workstation (100).

(102) A physical document, (e.g., an atlas), comprising one or a plurality of pages (e.g., the atlas maps) or a portion of a physical document (a page) placed aligned over or under the opto-touch foil (101).

User Workstation

The user workstation (100) can be an Internet enabled cell phone (e.g., the NOKIA 7110 or the 9110i Communicator), a PDA, an onboard computer, a network computer, an Internet appliance or any wireless IP enabled device, connected to the opto-touch foil (101).

In a preferred embodiment of the invention, the user workstation (100) is connected to the Internet network (103) and comprises a Web Browser application. Servers (104) are Web servers and the information and/or the service are Web pages hyperlinked to selected items and triggered from the Web browser. Locations associated to some items selected by the user on a Web page are illuminated by the opto-touch foil (101) placed over or under the physical document (102).

Opto-Touch Foil

In a preferred embodiment, the opto-touch foil (101) comprises a transparent resistive or capacitive film, of the type commonly used to manufacture touch screens. The generated signal is generally proportional to the coordinates of the point pressed. On this film is stacked a transparent organic light emitting device film (TOLED film). This light emitting device film is a transparent, bright, self-emitting display that can be directed to emit light from either or both surfaces. The opto-touch foil may communicate with the user workstation over an infrared link, a wired connection or any other communication means (e.g. by means of a wireless connection operating in the globally available 2.4 Ghz band of the "Bluetooth" specification, as promoted by the "Bluetooth Special Interest Group" and documented on the Official Bluetooth Website http://www.bluetooth.com/).

Physical Documents

Physical documents (102) can be of any kind, for example, different types of geographic maps (e.g., topographical maps, political maps, historical maps, route maps, shaded relief maps, city maps, natural resources maps, rail road maps or even any other type of map), novel books, text books, technical plans, commercial catalogs or even any other type of hard-copy, engraved, written, or printed surfaces (e.g., paintings in a museum of art). The material of the physical documents can be paper, plastic, wood or any other material.

System for Highlighting Positions on Physical Documents While Selecting and Accessing Multimedia Information The main components of the invention are the following:

Opto-Touch Foil

The opto-touch foil (101) comprises two, functionally independent transparent foils, namely a touch foil, and a light emitting foil (opto foil).

Figure 2:
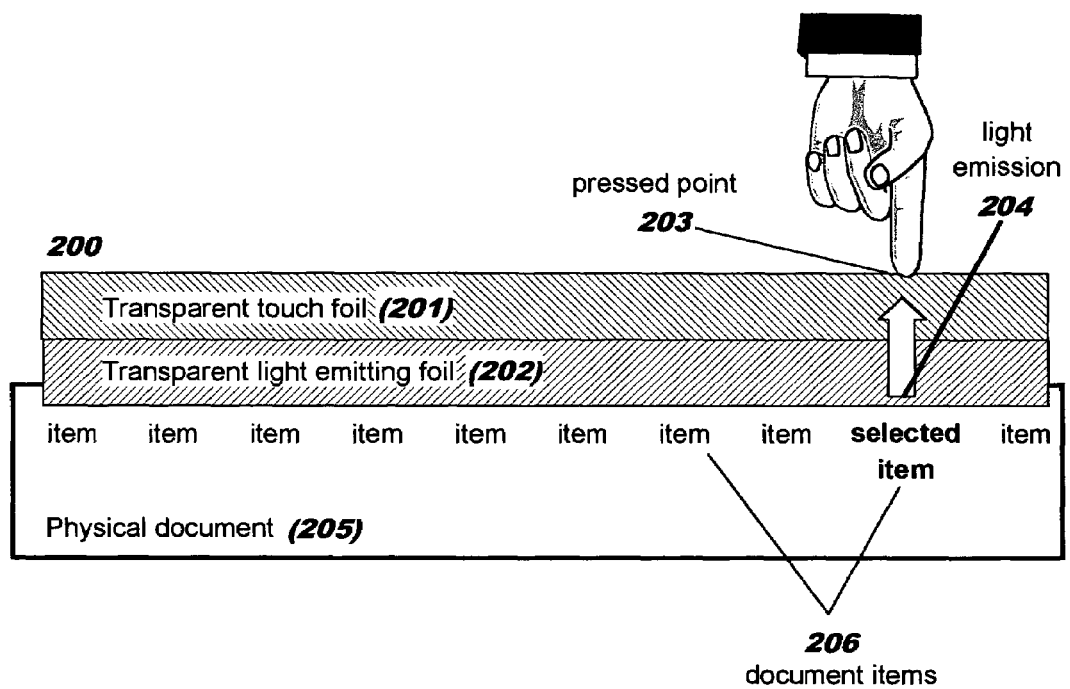
FIG. 2 shows the internal structure of the opto-touch foil.

FIG. 2 shows the cross section of an opto-touch foil (200) comprising:
- a transparent resistive or capacitive touch foil (201), of the type used commonly to manufacture touch screens, wherein the generated signals are generally proportional to the coordinates of the point that is pressed or touched (203); and
- a transparent light emitting foil (202), which is a transparent, bright, self-emitting display that can emit light (204) from either one or both surfaces.

The combination of both foils (i.e., the touch foil stacked over the light emitting foil) forms an opto-touch foil (200). FIG. 2 represents an opto-touch foil placed and aligned over a physical document (205) comprising a plurality of items (206) (i.e., words, pictures, icons, etc.) printed (or written, painted, engraved . . . ) on its surface.

Touch Foil Technology

The touch foil component (201) may be made of transparent resistive or capacitive films of the type used commonly to manufacture touch screens. The generated signal is generally proportional to the coordinates of the point pressed. One example of touch foil technology it would be possible to use, is the TouchTek4 (4-wire Analog Resistive Touchscreens) of MICRO TOUCH company (TouchTek™ is a trademark of the MICRO TOUCH Company). The TouchTek4 technology is fully described in the Web site of MICRO TOUCH Company at http://www.microtouch.com/.

Figure 3:
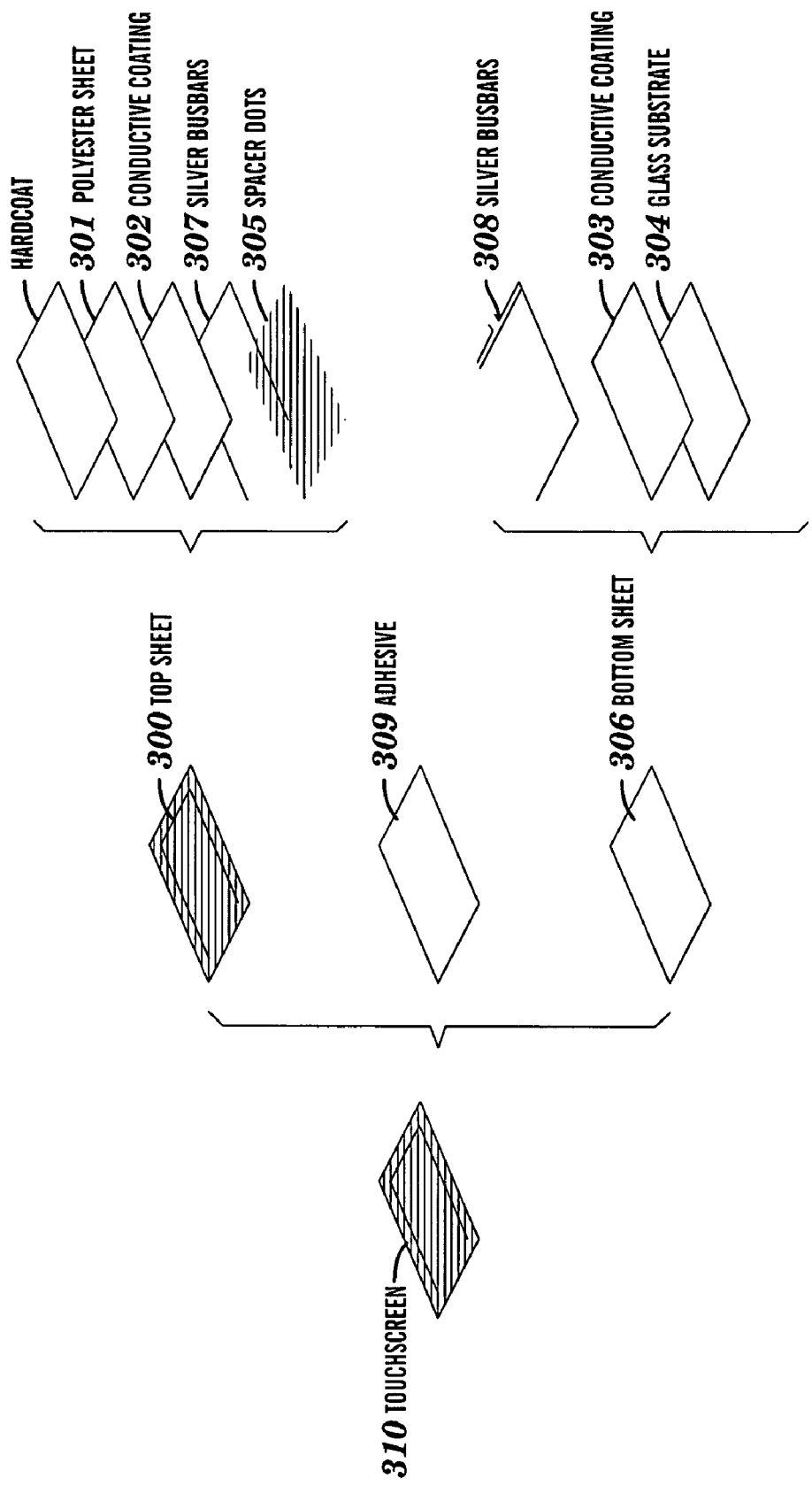
FIG. 3 shows an example of transparent touch foil technology.

As illustrated in FIG. 3, TouchTek4 touch screens (310) use a a polyester sheet (301) with a conductive coating (302) as a vertical conductive electrode, providing one-half of a touch coordinate. The topsheet (300) is separated from the bottom layer, a glass substrate (304) with a conductive coating (303), by spacer dots (305). The bottom sheet (306) is attached to the topsheet (300) by means of an adhesive (309). The bottom sheet (306) forms the horizontal conductive electrode, generating the second half of the touch coordinate. Silver bussbars located on the topsheet (307) and on the bottom sheet (308) pass the touch coordinates to the touchscreen controller. TouchTek4 touchscreens feature hard-coated polyester topsheets (300), available in several surface finishes. Spacer dots (305) are available in several dot arrays, optimized for finger, pen and finger, or pen-only input. The conductively-coated glass bottom sheet (303, 304) is available in several thicknesses. Electronic control is provided by a serial controller, or by 4-wire controllers. TouchTek4's specifications include narrow inactive border areas and compact touch sensors which allow system designers and OEMs to provide the largest useable screen area and full mouse emulation without sacrificing functionality or consuming excess power. Apart from being suited for implementing the touch foil functions of this invention, TouchTek4 touchscreens are commonly used in hand-held personal information management systems; PDAs; mobile computing systems; automotive, diagnostics and telecom devices; and Internet appliances.

Light Emitting Foil (Opto-foil)

The light emitting foil may be made of an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of light emitting foil technology suitable for use is the technology of the TOLEDs manufactured by UNIVERSAL DISPLAY CORPORATION.

The TOLED technology is fully described in the Web site of UNIVERSAL DISPLAY CORPORATION at:

Http://www.universaldisplay.com/toled.html.

Figure 4:
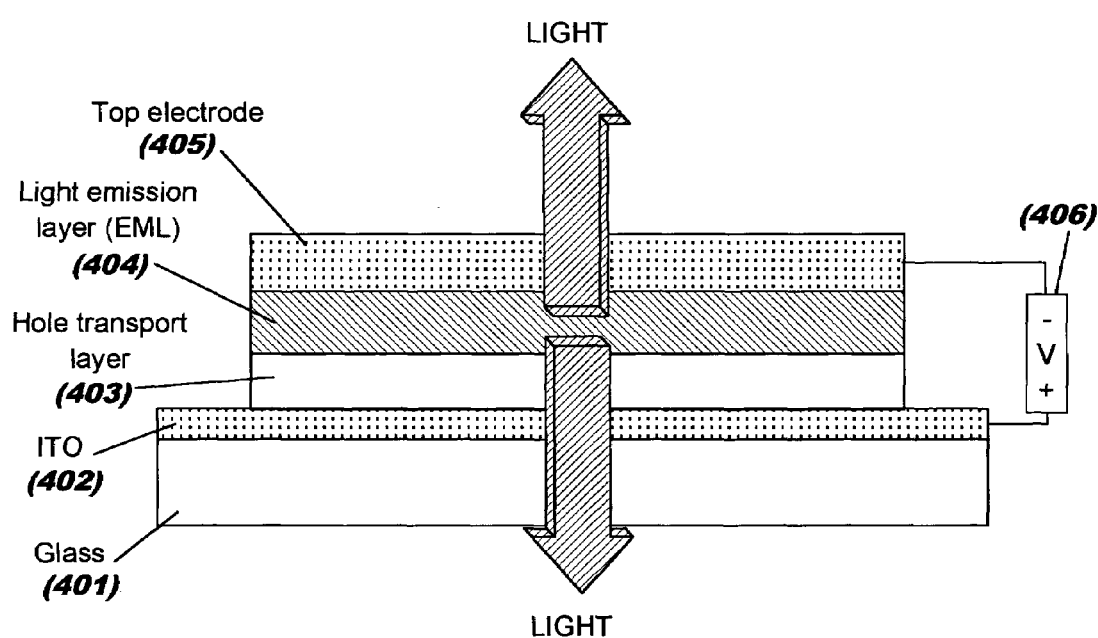
FIG. 4 shows an example of transparent light-emitting foil technology.

As illustrated in FIG. 4, in its most basic form, a TOLED is a monolithic, solid-state device comprising of a series of "small molecule" organic thin films sandwiched between two transparent, conductive layers. As a result, TOLEDs are bright, self-emitting displays that can be directed to emit from either or both surfaces. This is possible because, in addition to having transparent contacts, the organic materials are also transparent over their own emission spectrum and throughout most of the visible spectrum. Typically, a transparent conductive material (402), e.g., indium tin oxide (ITO), for hole-injection is deposited directly onto a glass substrate (401). Then, a series of organic materials are deposited by vacuum sublimation on the ITO layer: The first organic layer (403) serves as a hole-transporting layer (HTL) and the second layer (404) serves as both a light-emitting (EL) and electron-transporting layer (ETL). Finally, a transparent top contact (405) is deposited for electron injection on top of the organic films. When a voltage (406) is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light.

Since TOLEDs are thin-film, solid-state devices, they are very thin, lightweight and durable, ideal for portable applications, like the one disclosed in this invention. TOLEDs can be bottom, top, or both bottom and top emitting. Also, TOLED technology has attractive advantages regarding transparency (TOLED displays can be nearly as clear as the glass or substrate they are on, and when built between glass plates, TOLEDs are more than 80% transparent when turned off), energy efficiency (for longer battery life), full viewing angle, bright and high contrast light emission, fast response time, and environmental robustness. Thus, TOLEDs are well suited for manufacturing the light emitting foil component used jointly with the touch foil according to the present invention.

User Workstation

The user workstation (100) is used to access information and/or services stored locally or located on one or more servers (104) connected to the network (103). The user workstation may be, for example, an Internet appliance, a multimedia Personal Computer (PC), a set-top box, a TV monitor, a game console, a WAP protocol enabled cell phone, etc. The opto-touch foil may communicate with the user workstation by means of a cable, a wire pair, an infrared link, or a wireless radio link (e.g., a "Bluetooth" link).

Access to Information

Figure 5:
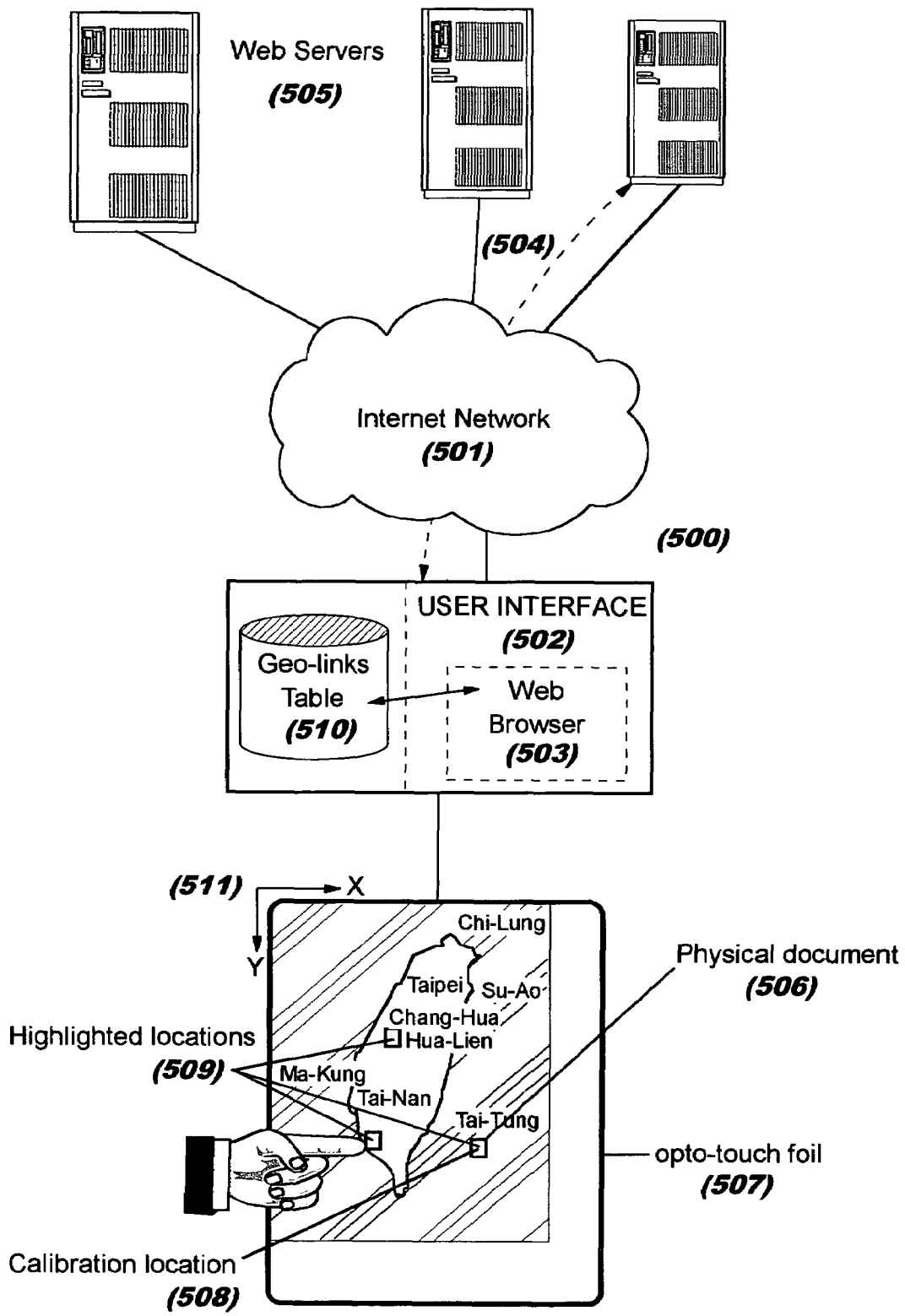
FIG. 5 shows the different components of the preferred embodiment of the invention.

In a preferred embodiment, locations or places in the world (e.g., towns, oil posts, motels, buildings, bridges, monuments, etc.) are referenced in Web pages by means of cartographic coordinates. When someone triggers a so called "geographic link" on a Web browser, a visual signal illuminates the selected location over a physical map. In the arrangement shown in FIG. 5, the user workstation (500) is connected to the Internet network (501). To access the World-Wide-Web (WWW), the workstation comprises a user interface (502) including a Web Browser (503) (also called "Web Client").

The method of illuminating on a physical map (506), locations referenced on a Web page comprises the following steps. First, the user selects a map covering the geographic area of the locations he wants to highlight. He places and aligns the map under the opto-touch foil (507) and enters the map scale in the workstation (500). To calibrate the opto-touch foil (507), the user selects on the Web page the "geographic link" of a particular location (calibration location) represented on the paper map. The opto-touch foil is calibrated by pressing the opto-touch foil on said location (508). As soon as this operation is executed, the locations (509) in the Web page for which geographic links are defined, are automatically highlighted on the map by means of spots of light emitted by the opto-touch foil (507). These geographic links are stored in a table called "Geo-links Table" (510). Each time the user triggers a geographic link on the Web page, the spot of light corresponding to this location blinks on the map.

When a location is selected on the map or on the Web page, the Web Browser program (503) sends a HTTP request (504) to the identified Web Server (505). A response (HTTP response) is sent back by the Web Server (505) in the reverse direction to the Web Browser (503). The HTTP response comprises the requested Web page which is associated with the selected illuminated item.

Geographic Links on Soft-Copy Documents

The definition of hyperlinks from an electronic document to a physical document implies the encoding of the absolute coordinates of the items referenced in the electronic document.

In a preferred embodiment, these hyperlinks are defined as "geographic links" (or "geo-links") and comprise the encoded geographic (cartographic) coordinates of the locations referenced in the electronic document (or Web page). These geographic links are defined in the form of an extension of HTML (Hyper-Text Markup Language), with the following syntax:

<geo href="hyperlink-URL" lat=Latitude lon=Longitude>Location_Name</geo>

This geographic link associates an item related to a location (Location Name) with the cartographic coordinates (Latitude and Longitude) of this location. Optionally, the geographic link associates a location (LocationName) with the Universal Resource Locator ("hyperlink-URL") of another electronic document.

Using an HTML extension of this type, the HTML source code of a Web page like the page hereunder,

---

Getting Around, Taking Precautions
If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

---

Can appear as follows:

<TITLE>Getting Around, Taking Precautions</TITLE>
If traveling from
<geo href= "http://www.interconti.com/croatia/zagreb/hotel_zagic.html"   lat= N 045° 36' 04"   lon= E 016° 12' 20" > Zagreb </geo> via
<geo href= "http://www.hr/hrvatska/HRgradovi/Karlovac/uvod-en.htm"   lat= N 045° 28' 17" lon= E 015° 43' 35"   > Karlovac </geo> and down through
<geo href= "http://www.sibenik-knin.com/"   lat= N 044° 03' 21" lon= N 016° 15' 26" > Knin </geo> you will cross the region known as Lika. This is a mountainous stretch through which runs the length of the Mala Kapela hills. There is a lovely section of national park known as Plitvice Jezera. At the center of the park is the
<geo href= "http://www.tel.hr/np-plitvice/smje/bellevue.htm"   lon= N 044° 18' 46" lat= E -continued 015° 45' 06" > Hotel Bellevue
</geo> and if you get in trouble on the road or run into inclement weather, it is a good place to hole up. It is, however, pricey. Primary villages along this route include
<geo href= "http://mx1.xoom.com/slunj/" lon= N 045° 13' 53" lat= E 015° 40' 18" > Slunj, </geo>
<geo href= " " lon= N 044° 52' 38" lat= E 015° 44' 37" > Plitvice, </geo>
<geo href= "http://www.aiha.com/english/partners/biozad/zdkn.htm" lon= N 044° 31' 19" lat= E 015° 45' 22"> Udbina, </geo> and
<geo href= "http://www.crotours.com/English/Beauties/Parks/velebit.htm" lon= N 044° 21' 07" lat= E 015° 48' 36"> Gracac. </geo> Between them is little or nothing.

Opto-Touch Foil Calibration

On a terrestrial meridian, one meter corresponds (very approximately) to an arc of:

F=(90×60×60)/10.000.000=0.0324 ("/m) (i.e., seconds of arc per meter).

Let, by definition, Fr (mm/unit) be the resolution of the touch foil (i.e., the number of mm over axis X and Y (511) of the touch-foil that correspond to each unit of sensed signal, e.g., mVolts, assuming it is the same for both axis); and Let Ms be the scale of the map (i.e., the number of terrestrial meters over the reference meridian per each mm measured on the map).

From the above definitions, parameter K is defined by the formula:

$$K = F \times Fr \times Ms \text{("/pulse)}.$$

Let LATc, LONc, the latitude and longitude of a calibration location selected on the Web page (measured in seconds of arc), Let Xc, Yc the coordinates measured by the touch foil when the user presses on the calibration location on the map, Let LATo, LONo the latitude and longitude on the map corresponding to the origin of the coordinates on the touch foil (i.e., to the point on the touch foil for which X=0 and Y=0).

The equations are:

$$LATo = LATc + K \times Yc$$

$$LONo = LONc - K \times Xc$$

Once LATo and LONo are known, the coordinates on the opto-touch foil also called foil coordinates (Xp, Yp) of any point P with latitude and longitude, LATp, LONp, (measured in seconds of arc) can be computed as follows:

$$Xp = (LONp - LON0)/K$$

$$Yp = (LAT0 - LAPp)/K.$$

"Geo-links" Table

When a Web page comprising geographic links is accessed, the information comprised in the geographic links of this Web page (locations names, cartographic coordinates and hyperlinks) are retrieved and stored in a table, named "geo-links" table (see in the next table, the first three columns of the geo-links table generated from the above example). Now, once an opto-touch foil (with a known resolution Fr) and a physical map (with a known map scale Ms) has been selected, and once the calibration procedure is achieved (by sensing the foil coordinates (Xc, Yc) of the calibration location and by using the formulas described here above), the foil coordinates for all "geo linked" locations are computed (see the fourth column on the next table). The "geo-links" table is completed with the foil coordinates of all "geo-links" locations referenced in the Web page. These foil coordinates are transmitted from the user workstation to the opto-touch foil that decodes them. They are then used to illuminate the position of the "geo linked" locations on the physical map.

| Calibration Location: | URL: | Map Scale: | Foil Resolut. |
|---|---|---|---|
| Knin | http://www.linder.com/berserk/dalmatia.html | 1,250,000 | 0,2 |
| LOCATION | HYPERLINK | LAT/LONG | FOIL X/Y |
| Zagrev | http://www.interconti.com/croatia/zagreb/hotel_zagic.html | N 045° 36' 04"<br>E 016° 12' 20" | –000<br>–000 |
| Karlovak | http://www.hr/hrvatska/HRgradovi/Karlovac/uvod-en.htm | N 045° 28' 17"<br>E 015° 43' 35" | 060<br>045 |
| Knin | http://www.sibenik-knin.com/ | N 044° 03' 21"<br>E 016° 15' 26" | 235<br>655 |
| Hotel Bellevue | http://www.tel.hr/np-plitvice/smje/bellevue.htm | N 044° 18' 46"<br>E 015° 45' 06" | 085<br>585 |
| Slunj | http://mx1.xoom.com/slunj/ | N 045° 13' 53"<br>E 015° 40' 18" | 050<br>155 |
| Plitvice |  | N 044° 52' 38"<br>E 015° 44' 37" | 070<br>290 |
| Udbina | http://www.aiha.com/english/partners/biozad/zdkn.htm | N 044° 31' 19"<br>E 015° 45' 22" | 110<br>445 |
| Gracac | http://www.crotours.com/English/Beauties/Parks/velebit.htm | N 044° 21' 07"<br>E 015° 48' 36" | 125<br>555 |

Note: "geo-link" Plitvice has no associated hyperlink. This is an example of non-hyperlinked "geo-link" location.

Method for Highlighting Positions on a Physical Document While Selecting and Accessing Multimedia Information The method of linking one or more items referenced in an electronic (soft-copy) document to geometric points on a physical (hard-copy) document, for automatically displaying these points using an opto-touch foil placed over the physical document, and for identifying on this physical document each one of the items referenced in the electronic document, comprises the steps of:

determining the absolute coordinates of all items referenced on the electronic document;

selecting a physical document representing at least the location of one item referenced in the electronic document;

identifying and determining the scale of the physical document;

placing the opto-touch foil aligned over or under the physical document;

selecting an item that is both referenced on the electronic document and represented on the physical document;

calibrating the opto-touch foil by pressing the opto-touch foil on a calibrating location;

highlighting by means of the opto-touch foil the points on the physical document corresponding to the items referenced on the electronic document;

selecting a highlighted point on the physical document by pressing the opto-touch foil on this point and highlighting the corresponding referenced item in the electronic document;

identifying the position on the physical document of an item referenced on the electronic document by activating the corresponding hyperlink and by making the point blink on the physical document.

accessing another electronic document by activating a hyperlink or by pressing on a point of the map corresponding to a referenced item.

The following example illustrates the method of using the system according to the present invention to help people to locate places of any kind, using conventional paper maps thanks to the information provided by the Web.

In this example a driver with a WAP enabled cell phone (like the one shown in FIG. 1) is traveling across the Balkans. At some point on the way from Zagrev to Karlovac, the user with his cell phone, access a Web page on http://www.linder.com/berserk/dalmatia.html. This Web page provides some traveling and tourist information about the region the driver intends to visit today. On this page (on the small alphanumeric display of the device), he finds an interesting reference describing several places on the route. The driver then finds a paper map of Zagrev and tries to locate on the map the places referenced on the Web page. FIG. 6 shows the information provided to the driver and the paper map of the region.

Glancing over the map, the driver locates several places referenced on the Web page, like Karlovac, Knin, Udbina and Gracac. However, he cannot locate other referenced places, like Zagrev, Hotel Bellevue, Slunj and Plitvice. Motivated by the title and the content of the page "Getting Around, Taking Precautions", the driver is particularly interested to determine the location on his route of the "Hotel Bellevue", which, unfortunately, is not specified on his map.

To locate on the map all places referenced (i.e., the "geographic links") on the Web page (and more particularly, the "Hotel Bellevue" ), as illustrated on FIG. 1, the user takes an opto-touch foil (101), connects it to his cell phone (100) (used as workstation) and places and fixes the map (102) underneath the opto-touch foil. Then the following tasks are performed:

i) Calibrating the Opto-Touch Foil

The calibration of the opto-touch foil is illustrated in FIG. 7. To calibrate the opto-touch foil, the user:

calls the opto-touch foil calibration procedure (700) from his workstation;

enters the map scale (701) (e.g., 1/1.250.000);

selects a calibration location (702) among all locations displayed on his workstation (e.g. Knin). This location must correspond to a position represented on the map. To maximize the precision of this calibration procedure, it is advisable to choose, among all the the locations displayed at the same time on the workstation and represented on the map, a location positioned far from both foil axis (i.e., far from axis X, and far from axis Y) or equivalently, relatively close to the diagonal axis X=Y and far from the foil origin point X=Y=0.

presses the opto-touch foil (e.g., by using a pencil) on the point of the map where the selected calibration location (703) is located (i.e., Knin).

ii) Highlighting on the Map Locations Represented by a "Geographic Link" in the Web Page As shown on FIG. 8, once the opto-touch foil has been calibrated, the locations inside the geographic area covered by the map, represented by a "geographic links" referenced in the Web page, are automatically highlighted on the map in the form of bright spots of light (801) emitted by the opto-touch foil. These spots of light show at a glance the positions of all referenced items on the map. On FIG. 8, seven locations have been highlighted on the map, five of them are identified by a legend on the map (corresponding to the towns of Karlovac, Knin, Slunj, Udbina and Gracac). The other two light spots, not referenced on the map, correspond to any one of the remainder three places referenced on the Web page (i.e., Zagrev, Hotel Bellevue or Plitvice). These locations can be identified by the user.

iii) Identifying on the Map the "Geographic Links" Referenced in the Web Page

As shown in FIG. 9, to recognize a location highlighted on the map but not identified (i.e., named) on this map, the user presses the opto-touch foil with a fingertip on the illuminated spot corresponding to this location (901). By doing this:

The light spot emitted by the opto-touch foil on this location (901) of the map blinks, and The name of the "geographic link" (902) corresponding to this location is highlighted (e.g., in reverse video) on the Web page.

FIG. 9 shows how the user can locate the "Hotel Bellevue".

iv) Accessing the Hyperlinked Information

As shown in FIG. 10, to access the information or service associated with an item referenced on the Web page (1001), the user activates the corresponding hyperlink from his workstation or from the physical document. The hyperlinked URL, if any, is then accessed throughout the Web, and the information on this URL address is retrieved and displayed on the user workstation (1002).

FIG. 10 shows how the user can access information concerning the "Hotel Bellevue" on the Web simply by triggering the corresponding "geographic link" from his workstation.

Practically all types of published paper maps (e.g., provided by geographic or cartographic services or by third parties), at any scale, can advantageously be used by the present invention. Paper maps can be published and used independently of the Web pages placed on the Web servers. Because Web pages comprise the cartographic coordinates (i.e., with the "geographic links") of the locations to highlight on maps, hotels, restaurants, oil posts, pharmacies, shops or businesses of any type can be easily located and identified on these maps when browsing said Web pages, thus attracting the interest of potential customers. Public authorities can help people to locate, by means of hard-copy maps, all kinds of services, resources or places of cultural or economic interest.

Being apparent that, apart from the herein described applications, there are many other possible applications of this invention, what has been described is merely illustrative of the application of the principles of the present invention. Other arrangements and methods can be implemented by those skilled in the art without departing from the spirit and the scope of the present invention.

What is claimed is:

1. A method of creating a geographic link from an electronic document to a physical document for locating, on the physical document, an item referenced in the electronic document, comprising the steps of:
- defining the referenced item in the electronic document, said electronic document not being derived from the physical document;
- determining geographic coordinates of the referenced item;
- defining the geographic link to the physical document; and
- encoding the geographic coordinates in the geographic link.

2. The method of claim 1, wherein the step of encoding further includes the step of encoding an address of a second electronic document in the geographic link.

3. The method of claim 2, wherein the address of the second electronic document is a Uniform Resource Locator address of a web server hosting the second electronic document.

4. The method of claim 1, further including the step of storing the geographic coordinates in a table.

5. The method of claim 1, further including the step of:
- computing foil coordinates on an opto-touch foil from the geographic coordinates of the referenced item and a calibration relationship, said opto-touch foil being aligned on the physical document, said calibration relationship being between geographic coordinates of a selected calibration location and calibration foil coordinates of the selected calibration location on the opto-touch foil, said selected calibration point having been selected from the electronic document and said opto-touch foil having been selectively touched or pressed at a position corresponding to where the calibration location appears in the physical document.

6. The method of claim 5, further including the step of storing the foil coordinates and the geographic coordinates in a table.

7. The method of claim 5, wherein the opto-foil comprises a touch foil and a transparent light emitting foil such that the touch foil is adapted to being directly touched or pressed and the light emitting foil is disposed between the touch foil and the physical document.

8. The method of claim 1, wherein the physical document includes a map.

9. The method of claim 1, wherein:
- the electronic document is a hyper text markup language document; and
- the geographic link uses syntactic conventions of hyper text markup language.

10. The method of claim 1, wherein the geographic coordinates include longitude and latitude.

11. A method of locating items appearing on a physical document, comprising the steps of:
- calibrating an opto-touch foil that is aligned on the physical document, said calibrating comprising processing a calibration location comprised by a plurality of locations appearing in the physical document and being referred to in an electronic document, said electronic document not being derived from the physical document, each location of the plurality of locations having geographical coordinates, said processing generating a calibration relationship between the geographic coordinates of the calibration location and calibration foil coordinates of the opto-touch foil, said calibration foil coordinates corresponding to where the calibration location appears in the physical document; and
- for each location of the plurality of locations, computing foil coordinates of the opto-touch foil corresponding to where each location appears in the physical document, said computing utilizing the geographic coordinates of each location and the calibration relationship.

12. The method of claim 11, further including the steps of:
- storing in a table for each location of the plurality of locations: an identifier of each location, the geographic coordinates of each location, and the foil coordinate of each location.

13. The method of claim 11, further including the step of sending the computed foil coordinates to the opto-touch foil to cause illumination of positions upon the opto-touch foil corresponding to where each location of the plurality of locations appears in the physical document.

14. The method of claim 11, further including the steps of:
- responsive to a first location of the plurality of locations being selected in the electronic document, sending the foil coordinates of the first location to the opto-touch foil to cause blinking of light at a first position upon the opto-touch foil corresponding to where the first location appears in the physical document.

15. The method of claim 12, further comprising storing an address of a second electronic document in the table.

16. The electronic document of claim 15, wherein the address of the second electronic document is a Uniform Resource Locator address of a web server hosting the second electronic document.

17. The method of claim 11, wherein the opto-foil comprises a touch foil and a transparent light emitting foil such that the touch foil is adapted to being directly touched or pressed and the light emitting foil is disposed between the touch foil and the physical document.

18. The method of claim 11, further including the step of:
- responsive to the opto-touch foil being pressed or touched at a first position corresponding to where a first location of the plurality of locations appears in the physical document, causing a blinking of light at the first position and highlighting the first location in the electronic document.

19. An apparatus for locating items appearing on a physical document, comprising:
- means for calibrating an opto-touch foil that is aligned on the physical document, said means for calibrating comprising means for processing a calibration location comprised by a plurality of locations appearing in the physical document and being referred to in an electronic document, said electronic document not being derived from the physical document, each location of the plurality of locations having geographical coordinates, said means for processing adapted to generate a calibration relationship between the geographic coordinates of the calibration location and calibration foil coordinates of the opto-touch foil, said calibration foil coordinates corresponding to where the calibration location appears in the physical document; and
- means for computing foil coordinates of the opto-touch foil, for each location of the plurality of locations, corresponding to where each location appears in the physical document, said means for computing utilizing the geographic coordinates of each location and the calibration relationship.

20. The apparatus of claim 19, further comprising a table that stores, for each location of the plurality of locations, an identifier of each location, the geographic coordinates of each location, and the foil coordinate of each location.

21. The apparatus of claim 20, wherein the table further stores an address of a second electronic document in the table.

22. The electronic document of claim 21, wherein the address of the second electronic document is a Uniform Resource Locator address of a web server hosting the second electronic document.

23. The apparatus of claim 19, further comprising:
means for sending the computed foil coordinates to the opto-touch foil to cause illumination of positions upon the opto-touch foil corresponding to where each location of the plurality of locations appears in the physical document.

24. The apparatus of claim 19, further comprising:
means for sending foil coordinates of a first location of the plurality of locations to the opto-touch foil to cause blinking of light at a first position upon the opto-touch foil corresponding to where the first location appears in the physical document,
said means for sending responsive to the first location being selected in the electronic document.

25. The apparatus of claim 19, wherein the opto-foil comprises a touch foil and a transparent light emitting foil such that the touch foil is adapted to being directly touched or pressed and the light emitting foil is disposed between the touch foil and the physical document.

26. The apparatus of claim 19, further comprising:
means for causing a blinking of light at a first position corresponding to where a first location of the plurality of locations appears in the physical document; and
means for highlighting the first location in the electronic document,
said means for sending and said means for highlighting responsive to the opto-touch foil being pressed or touched at the first position.

* * * * *